United States Patent Office

3,684,489
Patented Aug. 15, 1972

3,684,489
METHOD OF RECOVERING METALS FROM SULFIDE-CONTAINING MIXTURES
Klaus Emicke and Wilhelm Goralczyk, Hamburg, Germany, assignors to Norddeutsche Affinerie, Hamburg, Germany
No Drawing. Filed Sept. 8, 1970, Ser. No. 70,508
Claims priority, application Germany, Sept. 19, 1969, P 19 47 535.5
Int. Cl. C22b 15/08, 23/04
U.S. Cl. 75—101 R                                           7 Claims

ABSTRACT OF THE DISCLOSURE

Metals such as copper and nickel are separated from sulfide-containing mixtures or compositions thereof, e.g. copper-nickel matte, which contain at least one metal whose sulfide is unstable in sulfuric acid. The mixture is slurried in sulfuric acid with a $H_2SO_4$ concentration of at least 400 grams per liter. The slurry is evaporated to an $H_2SO_4$ concentration of 1000 g./l. and is then heated to a temperature above 120° C. but below 140° C. (preferably about 130° C.) until the metal having unstable sulfides is converted to its sulfate. The solid and liquid phases are then separated to recover a metal sulfate by leaching from the solid phase and enabling recovery of the metals from the separate phases.

(1) Field of the invention

Our present invention relates to a process for separating metals and, more particularly, for recovering metals from mixtures or compositions thereof containing sulfidic sulfur; the invention most specifically applies to the separation of copper and nickel from copper-nickel matte as may be produced by other metallurgical processes.

(2) Background of the invention

Numerous processes have been proposed for the separation of metals and, on an industrial scale, it is known to separate one metal from another in a mixture or composition by pyrometallurgical and hydrometallurgical techniques. Most pyrometallurgical systems effect breakdown of the compounds under heat in the presence or absence of other reactants designed to tie up or release the metal of interest. Hydrometallurgical processes make use of chemical reactions in an aqueous medium to separate the metals.

Pyrometallurgical procedures have the disadvantage that they require complicated apparatus, expensive dust-collection equipment, elevated temperatures and more careful monitoring of the reaction than most hydrometallurgical processes. Furthermore, pyrometallurgical techniques are less selective, for the most part, and do not always yield substantially quantitative separations.

Both hydrometallurgical and pyrometallurgical processes as proposed heretofore have the disadvantage that they can be carried out only with metal concentrations within specific and relatively narrow ranges. Of the hydrometallurgical processes which are currently in use for the separation of nickel and copper from nickel-copper mattes containing sulfidic sulfur, the Falcon-bridge and Outokumpu processes are of most interest.

In the Falcon-bridge process, the matte is subjected to an initial oxidation by roasting in the presence of oxygen before the mixture is subjected to treatment with sulfuric acid to form the sulfates. The roasting is carried out to convert the copper to copper oxide and the nickel to nickel oxide, subsequent leaching producing a solid fraction containing mainly nickel oxide and a liquid fraction containing copper. Almost invariably, the nickel fraction contains a residual high copper concentration while the copper extract has a high nickel concentration. As a result, a considerable proportion of one fraction must be recirculated through the process stages for the system to be economically feasible and relatively pure metal be obtained. In the Outokumpu process, sulfuric acid and air are used to treat the nickel-copper matte and thereby form a copper-free nickel extract as the liquid phase. The solid residue, however, contains considerable amounts of nickel together with the primary metal, copper. In this case large amounts of nickel must be recirculated. Electrolytic purification of the copper, in spite of the recirculation and repetition of the leaching and treatment steps, generally yields a product with a minimum of 100 parts/million (p.p.m.) nickel.

OBJECTS OF THE INVENTION

It is, therefore, the principal object of our present invention to provide an improved process for separating one metal from another in a mixture or composition containing sulfidic sulfur whereby the aforementioned disadvantages are avoided.

Another object of our invention is to provide an improved method of the character described which permits a relatively pure metallic component to be obtained from such mixture or composition and yet requires no significant recirculation of the metals of interest.

We have, as our object, also the provision of an improved intermediate procedure in the production of high-purity metals to separate or recover at least one metal with relatively high purity from a sulfidic composition containing a number of metals not readily separable by earlier hydrometallurgical techniques.

It is still another object of the invention to provide an improved process for separating copper and nickel from one another and/or recovering copper and/or nickel relatively free of contamination of one by the other, from copper-nickel matte.

SUMMARY OF THE INVENTION

We have now found that these objects can be obtained by a specific treatment of sulfidic compositions containing at least two metals, one of which has a sulfide which is stable in the presence of sulfuric acid while another has a sulfide which is unstable in sulfuric acid.

According to the principles of the present invention, the comminuted sulfide composition, e.g. a copper-nickel matte as obtained from a pyrometallurgical process, is treated with sulfuric acid of a $H_2SO_4$ concentration of at least 400 grams per liter (g./l.) but less than 1000 g./l. $H_2SO_4$ to form a slurry. In practice, the solid composition is slurried with the sulfuric acid ($\cong$ 400 g./l. $H_2SO_4$) in an amount sufficient to chemically react the metal whose sulfide is unstable in the sulfuric acid, the "slurrying" corresponding to a digestion of the solid component with the sulfuric acid liquor. The slurry is, according to the present invention, evaporated to a concentration of about 1000 g./l. $H_2SO_4$, although slightly higher concentrations are possible. Preferably, the initial concentration of the sulfuric acid will be less than about 800 g./l. $H_2SO_4$ and the evaporation will yield a digested slurry with a sulfuric acid concentration of at least 900 g./l. $H_2SO_4$ but less than about 1200 g./l. $H_2SO_4$. After the slurry is evaporated to the indicated concenration, it has been found to be essential to heat the slurry to a temperature of about 130° C. but not more than 140° C. for a period of about one hour. In practice, it has been found that this period may range from 30 minutes to tens of hours, but the effect falls off sharply after about one hour so that this constitutes both the economical upper limit and the preferred duration of heating. The heating stage may use temperatures below 130° C. although the effectiveness of the process decreases rapidly below this temperature and a practical minimum temperature for the reheating stage is 120° C.

The duration of heating is determined by the composition in the sense that heating should be maintained until the metal or metals, having sulfides which are unstable in the presence of sulfuric acid, is or are fully converted to the corresponding metal sulfates. The solid phase is then separated from the liquid phase, according to the invention, and is found to consist of metal sulfates which may be leached with water to produce an extract containing the metal sulfates and a solid component containing metal sulfides substantially free from those metals which have unstable sulfides in the presence of sulfuric acid. These components may be individually subjected to any conventional treatment for recovery of the metal or of any metal compounds which may be of interest.

The initial separation of the sulfuric acid from the digested solid may be carried out by filtration, centrifugation, decantation or the like. The starting material is preferably slurried in a sulfuric-acid medium having a concentration of about 600 g./l. $H_2SO_4$, this solution being found to be particularly effective with copper-nickel matte and the treatment of these mixed copper-nickel sulfides, in accordance with the present invention, constitutes one of the most important aspects thereof. To solubilize the copper-nickel matte, we slurry the comminuted or disintegrated matte with sulfuric acid having a concentration of 600 g./l. $H_2SO_4$ to permit complete digestion of all of the soluble components. A copper-nickel matte consisting entirely of copper and nickel sulfides is found to be completely solubilized in short order and any contaminants which may be present in the matte separate as a solid which may be removed. The slurry may be reformed by concentration of the liquor by heating to a temperature corresponding approximately to the boiling point thereof until the concentration reaches 1000 g./l. $H_2SO_4$. Thereafter, the slurry is heated to 130° C. and stirred for a period of one hour at this temperature. The liquid phase is separated from the solid phase as indicated and the solid phase is then leached with water to form a liquid component and a solid residue. The liquid component is found to contain nickel sulfate and to be substantially free from copper salts, whereas the solid residue contains copper and any noble or low reactivity metals and is substantially free from nickel. Both the liquid component and the solid residue may be subjected to further processing to recover metallic nickel or metallic copper.

It should be noted that the present system eliminates the need for complicated preliminary treatments, including the necessity of a roasting or oxidation step. Furthermore, since the separation is substantially quantitative, there is little or no need to recirculate any of the metals (copper or nickel) of principal interest. Since the supply of gas is not a feature of this invention, pressure need not be maintained and it has been found that the process is substantially independent of the relative amounts of copper and nickel in the starting material. While the invention has been described generally with respect to copper-nickel matte, it should be understood that it is applicable to other starting materials, for example cobalt-copper compositions containing sulfidic sulfur.

SPECIFIC EXAMPLE 1000 kg. of finely ground nickel-copper converter matte (35.2% by weight copper, 40.7% by weight nickel, 1.8% by weight iron and 19.8% by weight sulfur) was charged into 5000 liters of sulfuric acid (600 g./l. $H_2SO_4$) to form a slurry. The mixture was stirred and the slurry was subjected to concentration by evaporation at the boiling point to 1000 g./l. $H_2SO_4$. The product was a viscous sludge that was heated to 130° C. with stirring by paddles for one hour. The sludge was then filtered to yield a filtrate consisting of concentrated sulfuric acid which was recirculated for the digestion of additional amounts of copper-nickel matte.

The solid phase was leached with water at 80° C. to produce 4000 liters of a nickel sulfate solution containing 95 g./l. nickel, 3.8 g./l. iron and 30 g./l. $H_2SO_4$. The solution was completely free from copper and contained about 95% of the nickel of the original charge. The solid residue was separated from the nickel solution by filtration and was analyzed. The 480 kg. of residue contained 71.25% copper, 4.45% nickel, 0.4% iron and 22.1% sulfur (all percents by weight). Both the solution and the solid residue was subjected to conventional processes for the recovery of nickel and copper respectively.

We claim:
1. A method of separating a metal having a sulfide unstable in sulfuric acid from another metal having a sulfide stable in sulfuric acid in a metallurgical composition containing said metals in combination with sulfidic sulfur, consisting of the steps of:
    (a) slurrying said composition with sulfuric acid at a concentration of at least 400 g./l. $H_2SO_4$ but less than 1000 g./l. $H_2SO_4$;
    (b) concentrating the resulting slurry at the boiling point thereof to a sulfuric acid concentration of about 1000 g./l. $H_2SO_4$;
    (c) heating the concentrated slurry of step (b) to a temperature of 120° C. to 140° C. for a period sufficient to convert the unstable sulfide into the corresponding metal sulfate, thereby producing a solid phase containing the sulfate of a metal having the unstable sulfide and sulfides of the other metal and an acidic liquid phase;
    (d) separating said solid phase from said liquid phase; and
    (e) leaching said solid phase with water to form a solution of said sulfate substantially free from said other metal and a solid residue containing substantially all of the other metal of said composition.

2. The method defined in claim 1 wherein said composition is slurried in sulfuric acid in step (a) of a concentration of about 600 g./l. $H_2SO_4$.

3. The method defined in claim 2 wherein said composition is a copper-nickel matte.

4. The method defined in claim 3 wherein said period is about one hour.

5. The method defined in claim 4, further comprising the step of recovering nickel from said solution of said sulfate.

6. The method defined in claim 5, further comprising the step of recovering copper from said solid residue.

7. The method defined in claim 6 wherein said slurry is concentrated in step (b) by evaporation at the boiling point of the slurry.

References Cited

UNITED STATES PATENTS

| 1,756,092 | 4/1930 | Lathe | 75—119 |
| 2,223,239 | 11/1940 | Hamprecht et al. | 75—119 |

GEORGE T. OZAKI, Primary Examiner

U. S. Cl. X.R.

75—115, 117, 119; 23—117, 125